(12) United States Patent
Sferrazza

(10) Patent No.: US 7,849,422 B2
(45) Date of Patent: Dec. 7, 2010

(54) EFFICIENT CELL SWAPPING SYSTEM FOR LEAKAGE POWER REDUCTION IN A MULTI-THRESHOLD VOLTAGE PROCESS

(75) Inventor: Benjamin S. Sferrazza, Sunnyvale, CA (US)

(73) Assignee: LSI Corporation, Milpitas, CA (US)

( * ) Notice: Subject to any disclaimer, the term of this patent is extended or adjusted under 35 U.S.C. 154(b) by 651 days.

(21) Appl. No.: 11/765,691

(22) Filed: Jun. 20, 2007

(65) Prior Publication Data
US 2008/0320420 A1   Dec. 25, 2008

(51) Int. Cl.
*G06F 17/50* (2006.01)
(52) U.S. Cl. .................. 716/2; 716/1; 716/6; 716/12
(58) Field of Classification Search .................. 716/1, 716/2, 6, 12
See application file for complete search history.

(56) References Cited

U.S. PATENT DOCUMENTS

| | | | | |
|---|---|---|---|---|
| 7,448,009 | B2* | 11/2008 | Pundoor | 716/6 |
| 7,496,867 | B2* | 2/2009 | Turner et al. | 716/2 |
| 2004/0230924 | A1* | 11/2004 | Williams et al. | 716/2 |

\* cited by examiner

*Primary Examiner*—Thuan Do
(74) *Attorney, Agent, or Firm*—Christopher P. Maiorana, PC

(57) ABSTRACT

A method for designing an integrated circuit, comprising the steps of (A) calculating an efficiency value for each of a plurality of equivalent cells in the design; and (B) selecting a number of the plurality of equivalent cells based on the efficiency values. The equivalent cells (i) decrease an overall delay of a path to meet a timing specification, and (ii) minimize an increase in overall leakage current.

18 Claims, 4 Drawing Sheets

EFFICIENT CELL SWAPPING SYSTEM FOR LEAKAGE POWER REDUCTION IN A MULTI-THRESHOLD VOLTAGE PROCESS

FIELD OF THE INVENTION

The present invention relates to integrated circuit design generally and, more particularly, to a system for implementing efficient cell swapping system for leakage power reduction in a multi-threshold voltage process.

BACKGROUND OF THE INVENTION

In conventional modern synthesis electronic design analysis (EDA) tools, a synchronous design is normally mapped to a set of gates (often standard cell gates), placed, and routed, all while meeting a large number of design constraints. Timing is normally at the top of the list of constraints. Without meeting the setup and hold time constraints, a design will not operate reliably under particular timing specifications. As a result, other design constraints, such as area and power, are often not efficiently improved by existing EDA solutions, since timing receives most of the focus in such systems. With scaling technologies often below a 100-nm minimum feature size, leakage power is becoming an increasing problem in modern integrated circuit (IC) designs. To mitigate the effects of subthreshold leakage current, most modern processes feature multi-threshold voltage (multi-Vt) standard cells. Low threshold (and subsequently high-speed) gates are used along timing critical paths. High threshold (and subsequently low-leakage) gates are used along non-critical paths. The ability to map a design to two or more sets of standard cells greatly complicates synthesis as an EDA tool attempts to meet timing while minimizing leakage current.

From a high-level, an optimally mapped multi-Vt design would be one that meets the specified timing constraints with zero positive timing slack while using the most efficient amount of high-Vt cells. Designs are often over-constrained to provide additional timing margins. A design with zero positive timing slack would be one that does not violate the additional over-constraint.

It would be desirable to implement a method that offers a near-optimal timing-leakage power balance.

SUMMARY OF THE INVENTION

The present invention concerns a method for designing an integrated circuit, comprising the steps of (A) calculating an efficiency value for each of a plurality of equivalent cells in the design and (B) selecting a number of the plurality of equivalent cells based on the efficiency values. The equivalent cells (i) decrease an overall delay of a path to meet a timing specification, and (ii) minimize an increase in overall leakage current.

The objects, features and advantages of the present invention include providing a system that may (i) implement cell swapping for leakage power reduction, (ii) be implemented in a multi-threshold voltage process and/or (iii) use an iterative process to maximize efficiency.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

The present invention may be useful in a design having a total positive timing slack. Such a design may be thought of as possibly having an opportunity to substitute high-Vt cells for existing low-Vt cells in an effort to reduce leakage power. The present invention may be useful to implement a design that seeks to have an efficient mix of high-Vt and low-Vt cells. Such a design may be implemented to meet timing, without additional opportunity for leakage power reduction. Such a design may be said to have an optimal timing-leakage power balance.

The present invention may provide a system that analyzes all cells along a particular path. The cell analysis may be used to decide whether a functionally equivalent cell should be remapped in view of multiple design constraints. The system may determine whether to remap without attempting to re-structure particular combinational logic in the timing paths. In one example, the results of the system in the mapping stage may be used as feedback information, for the structuring phase, to iterate and reach an optimal structure of the logic. The system normally remaps or considers functionally equivalent alternatives for each cell. For example, if two inverters feed a 2-input NOR gate which drives another inverter, the system will provide analysis without restructuring the logic to a 2-input NAND gate. By preserving the original design, optimization normally remains true to the original design.

For example, consider remapping a number of inverters to other inverters with a similar logic, and remapping a NOR gate to an alternative NOR gate. The remapping may be limited, for example, to multi-Vt equivalent cells, and not larger or smaller gates within the same Vt class. The advantage of such a restriction is that the multi-Vt versions of a gate typically share the same footprint or cell size. Replacing a cell with one of a number of equivalent multi-Vt cells does not involve replacement of cells or re-routing of wires. The results of such a cell swap may be predictable. Such a predictable cell swap would normally allow cell swapping very late in the design cycle (e.g., just before tapeout). If such a restriction on cell swapping was not imposed, a more efficient mix of low-Vt and high-Vt cells may result. However, the number of iterations and runtime for implementing such a system may increase. The particular balance between efficiency and flexibility may be varied to meet the design criteria of a particular implementation.

Figure 1:
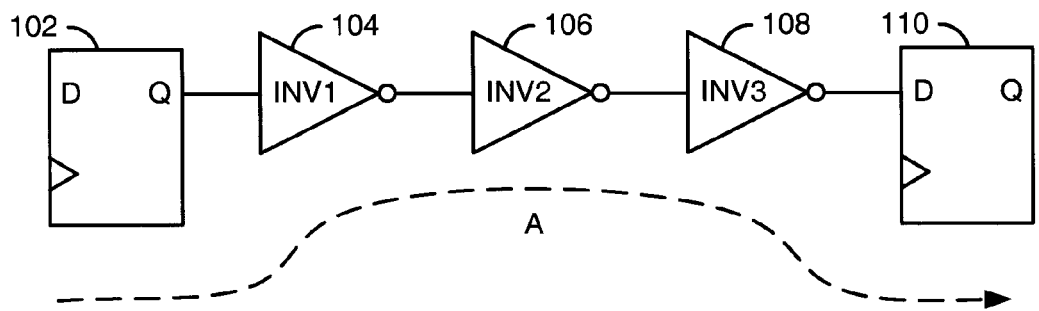
FIG. 1 is a diagram illustrating a timing path used to describe the operation of the present invention.

Referring to FIG. 1, a diagram of a circuit 100 is shown. The circuit 100 illustrates some of the concepts of the present invention. The circuit 100 implements a simple timing path (e.g., a path A) comprising a flip-flop 102, an inverter 104, an inverter 106, an inverter 108, and a flip-flop 110. Although such a simple timing path as the circuit 100 is rare in most modern circuit designs, the circuit 100 offers an example illustrating the problem of efficiently meeting both timing and leakage power constraints. Suppose the path of the circuit 100 is originally mapped to the three low-Vt inverters 104, 106 and 108 and the two low-Vt flip-flops 102 and 110. Also suppose such a path meets setup timing designs with considerable slack (e.g., timing beyond the specified value of the particular implementation). The system of the present invention may first consider swapping all existing cells in the path A to a high-Vt equivalent. In such an example, the setup timing will suffer, but the system may decide which of the cells along the path to swap to an equivalent low-Vt version to regain the time lost by swapping all cells to a high-Vt version. In doing so, the system provides flexibility to decide an efficient mix of low-Vt and high-Vt cells that allows the path to meet timing while minimizing leakage power. In swapping any of the cells 102-110 to a low-Vt equivalent, there will normally be some amount of total delay decrease.

Quantifying the total decrease in delay involves a number of variables. Suppose the inverter 106 is swapped to a low-Vt equivalent. As the drive strength of the inverter 104 increases, the input to output delay of a signal moving through the path A also decreases. However, the timing change is not limited to the cell being swapped. The input capacitance of the gate may increase, which will increase the delay through the inverter 104. If the inverter 104 were to drive any gates other than the inverter 106, slower transition times due to the increased capacitance of the inverter 106 would normally also increase the delay through the other cells. The increased drive strength of the inverter 106 normally sharpens the transition time at the input of the inverter 108. This will tend to decrease the delay, or improve timing, through the inverter 108. These changes in transition will also have impacts on cross-talk interference. A sharpened transition time will tend to make the signal less susceptible to cross-talk delay, thereby speeding up the path. A sharpened transition will also increase the ability of a particular signal to interfere with and delay another neighboring net. The reverse is true of a signal which has a transition time increased, such as that of the output net of the inverter 104. In replacing the inverter 106 with a low-Vt equivalent, there will be some positive timing impacts and some negative timing impacts. However, the total impact on the design will likely be a decrease in delay.

Swapping the cell 106 with a low-Vt equivalent cell will also normally have an associated increase in leakage power. By knowing the decrease in delay of a particular cell swap and the corresponding increase in leakage power, the efficiency of swapping a cell to a low-Vt equivalent may be graded (to be described in more detail in connection with FIG. 4). Such grading may be used to balance the overall speed versus power of the path being analyzed. Rather than simply choosing to swap the cells with the greatest leakage with a corresponding high-Vt equivalent, or swapping the slowest high-Vt cells with a corresponding low-Vt equivalent, the present invention chooses to use low-Vt cells that provide the greatest timing improvement per increase in leakage power. In the simplest sense, the efficiency grade for each cell may be expressed as a ratio of the decrease in delay to the increase in leakage power, or seconds per Watt (s/W, or in some other more suitable ratio such as ps/pW).

However, such a definition normally only provides a basic estimate. Additional analysis may also be implemented. For example, suppose after swapping all cells of the above timing path to high-Vt cells that the timing path starts to violate setup timing by 300 ps. Now suppose that by swapping the inverter 104 to a low-Vt equivalent that the inverter 104 decreases an associated delay by 305 ps and increases an associated leakage by 2500 pW. Also suppose the inverter 106 improves an associated delay by 400 ps and increases an associated leakage by 2550 pW. Furthermore, also suppose the inverter 108 improves an associated delay by 600 ps and increases an associated leakage by 2600 pW. If the basic efficiency grade were assigned to each of these cell swaps, then swapping the inverter 108 would seem to be the most efficient. However, since the path would initially violate timing by 300 ps, there is no benefit to swapping a cell that regains 600 ps of that timing, since an improvement of 300 ps is all that is needed. Therefore, swapping the inverter 104 to an equivalent low-Vt is the most efficient cell swap, since the corresponding increase in leakage is lowest, at 2500 pW. The efficiency grade may be rewritten as the decrease in delay that contributes to improved timing versus the increase in leakage power. In the example described, each of the cell swaps improves timing by at least the amount that is needed, or 300 ps. Therefore, power improvement should be used as a secondary consideration.

Figure 2:
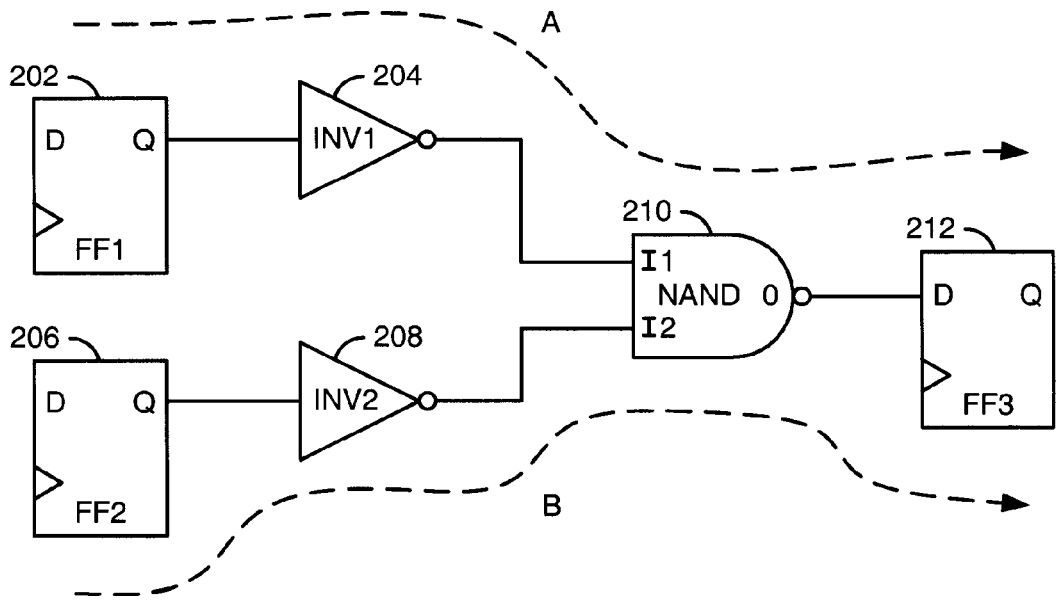
FIG. 2 is a diagram illustrating another timing path used to describe the operation of the present invention.

Referring to FIG. 2, a diagram of a circuit 200 is shown. The circuit 200 illustrates how an efficiency grade may be improved when using slightly more complicated timing paths. The circuit 200 generally comprises a flip-flop 202, an inverter 204, a flip-flop 206, an inverter 208, a gate 210, and a flip-flop 212. In one example, the gate 210 may be implemented as a NAND gate.

Suppose that the path between the flip-flop 202 and the flip-flop 212 (e.g., a path A) begins to violate timing by 430 ps and the path from the flip-flop 206 and the flip-flop 212 (e.g., a path B) begins to violate timing by 400 ps after all cells are timed with equivalent high-Vt cells. Swapping the inverter 204 to a low-Vt equivalent may decrease the delay by 430 ps and increase leakage power by 2400 pW. The inverter 208 may have similar increases and/or decreases. Swapping the NAND gate 210 may decrease an associated delay by 440 ps and increase leakage power by 4000 pW. Applying the basic model for efficiency from above, replacing the inverters 204 and 208 may initially seem to have a higher efficiency than replacing the NAND gate 210.

For example, by replacing both of the inverters 204 and 208 with a low-Vt equivalent, both the path A from the flip-flop 202 to the flip-flop 212 and the path B from the flip-flop 206 to the flip-flop 212 will begin to meet timing. However, by replacing just the NAND gate 210, both the path A and the path B would begin to meet timing as well. Therefore, grading the efficiency as the decrease in delay of a particular gate to the increase in leakage power is not enough. The overall number of violating paths that are improved by a particular cell swap also needs to be considered. More accurately, the total change in delay that impacts timing normally needs to be considered.

For example, suppose the delay through one of the inputs (e.g., I1) to the output (e.g., O) of the NAND gate 210 is improved by 450 ps. Suppose the delay thorough the other input (e.g., I2) to the output O is improved by 420 ps. However, if the I1-to-O delay was along the path A from the flip-flop 202 to the flip-flop 212, the improvement in delay along that path would be 430 ps, the amount of the path A violation. The decrease in delay along the path B would be 400 ps. So the total decrease in delay when replacing the NAND gate 210 would be 830 ps. An efficiency ratio for the NAND gate 210 would therefore be 830 ps/4000 pW=0.2075, versus an efficiency ratio of 0.1792 and 0.1667 for the inverters 204 and 208. Despite increasing leakage by more than either of the inverters 204 and 208, the overall efficiency is improved by swapping the NAND gate 210 because of the total positive impact on timing. If accurately determining the decrease in delay of each independent path is difficult or too time consuming, the average improvement in delay of the gate multiplied by the number of paths that are improved by a particular swap may also be used as an estimate. In the example discussed, an efficiency rating of (2*420 ps)/4000 pW may result.

Figure 3:
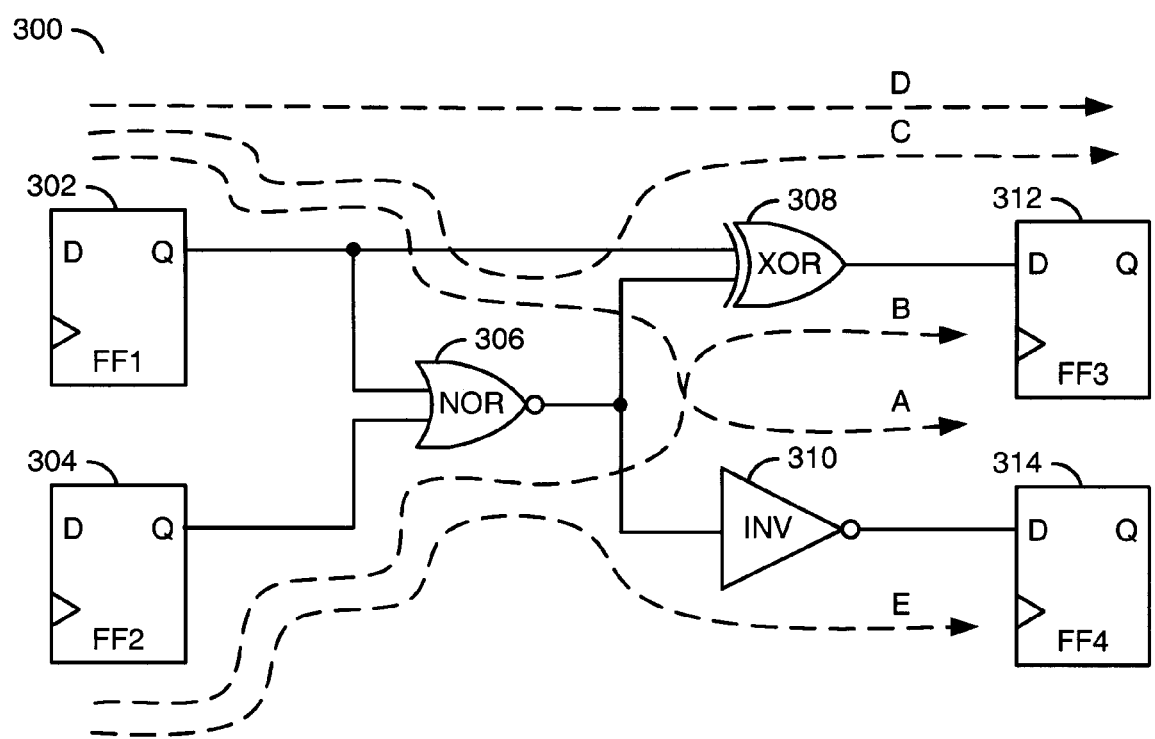
FIG. 3 is a diagram illustrating a more complicated timing path used to describe the operation of the present invention.

Referring to FIG. 3, a circuit 300 is shown. The circuit 300 illustrates a more typical timing paths of a modern design. The timing paths present include multiple startpoints and multiple endpoints. The circuit 300 generally comprises a flip-flop 302, a flip-flop 304, a gate 306, a gate 308, a gate 310, a flip-flop 312, and a flip-flop 314. The gate 306 may be implemented as a NOR gate. The gate 308 may be implemented as a XOR gate. While specific gates are shown, the particular type of gate implemented may be varied to meet the design criteria of a particular implementation.

In this example, the inverter 310 is part of both a path between the flip-flop 302 and the flip-flop 314 (e.g., a path A) and a path between the flip-flop 304 and the flip-flop 312 (e.g., a path B). The XOR gate 308 is along two paths between the flip-flop 302 and the flip-flop 312 (e.g., a path C through the NOR gate 306 and a path D directly through the XOR gate 308) and the path B, for a total of three of the five possible paths (e.g., path B, C, and D). A path E is shown from the flip-flop 304 to the flip-flop 314. The NOR gate 306 is along four of the five possible paths (e.g., the paths A, B, C and E). Therefore, the NOR gate 306 may likely be the most efficient cell to swap to low-Vt equivalent.

The total decrease in delay impacts timing that needs to be considered when grading the efficiency of swapping a particular gate (or gate). Swapping a particular cell is not limited to affecting only the delay of the cell that was swapped. Balancing these two statements illustrates the complexity in finding an optimal mix of multi-Vt cells in a design.

Suppose by swapping the NOR gate 306 in the above example that the improvement in delay along all four paths A, B, C, and E is 400 ps, with an increase in leakage power of 1000 pW. By swapping the XOR gate 308, the paths A, B, C, and E have an improved timing of 400 ps, with an increase in leakage power of 600 pW. By swapping the inverter 310, the paths A and E have an improved timing of 400 ps, with leakage power being increased by 500 pW. All of the paths A-E are violating timing by 400 ps, except for the path D from the flip-flop FF1 to the flip-flop FF3 that does not pass through the NOR gate 306 which is meeting timing with 50 ps of positive slack. Swapping the NOR gate 306 will have an efficiency of (4*400 ps)/1000 pW=1.6. Swapping the XOR gate 306 and the inverter 310 as an alternative will have an efficiency of (4*400 ps)/(600 pW+500 pW)=1.455.

However, suppose by swapping the NOR gate 306 in the above example that the increased input capacitance increases the delay of the path D from the flip-flop 302 to the flip-flop 312 by 100 ps such that the path D now starts to violate timing by 50 ps. Not only would the efficiency of the NOR gate 306 go down (e.g., 4*400 ps−50 ps)/1000 pW=1.55), but swapping the NOR gate 306 alone would not be an efficient enough solution to improve timing, since all of the paths A-E meet timing. Swapping the gate 306 would also involve swapping the XOR gate 308. The NOR gate 306 and the XOR gate 308 swap would have an efficiency of (4*400)/(1000 pW+600 pW)=1. Therefore, the XOR gate 308 and the inverter 310 swap solution would be better than swapping the NOR gate 306 despite the higher efficiency, due to the negative impact on timing. The example also illustrates that the efficiency of each gate cannot be graded in isolation, since swapping one cell will have an impact on the efficiency of other cells. Therefore, the system iteratively swaps cells and reevaluates the total efficiency of all cell swaps. Such a complex system may take a large amount of time, especially when you consider the change in cross-talk coupling that would occur as cells are swapped. The present invention may reduce the number of simulations needed.

For example, an ideal case implementation of the present invention may consider all of the cell permutations and all combinations of cell mixing before the most optimal solution is implemented. Analyzing every combination is not an efficient implementation and may not even be practical with the size of modern designs, but would relatively guarantee finding an optimal mix. An iterative process of the present invention may be implemented to converge on the same results as the implementation that evaluates all possible combinations. All paths of a design would normally be evaluated independently with the most efficient cells being swapped first. The design would be continually reevaluated and iteratively processed until an optimum mix of multi-Vt cells is obtained. In particular, leakage power should be minimized and the total positive slack (e.g., the extra timing beyond the specified timing target) should also be minimized. Further efficiency may be obtained by not restricting cell swapping to only the multi-Vt equivalents. All cells that are functionally equivalent would be allowed to be used, with re-placement and re-routing, as needed. If a system of the present invention is implemented within an EDA place-and-route tool, the iterations may also include place-and-route as part of the routine with the information that would effect timing being fed into the system. Even greater efficiency may be achieved if the results from the remapping are fed into the structuring phase of the EDA tool. The end result may not only include a design that is optimally mapped to minimize leakage power and minimize excessive positive slack, but may be optimally structured and mapped to meet additional constraints.

Since an ideal implementation is not practical, and since the invention may be run outside of an existing EDA tool, tradeoffs between performance and runtime may be reached. One implementation of the invention restricts cell swapping to same-sized multi-Vt equivalents, where restructuring was not performed. Efficiency of cell swaps may be graded separately for each cell. Gate delays may be first calculated by considering transition times and capacitive loads, without regard to cross-talk effects. An estimation of the change in gate delays for a cell swap may be implemented, since full-retiming may be prohibitively slow for each calculation. After all cell swaps are implemented, the design may be full-retimed. If timing violations continue after the cell swapping, the process would be repeated.

Figure 4A:
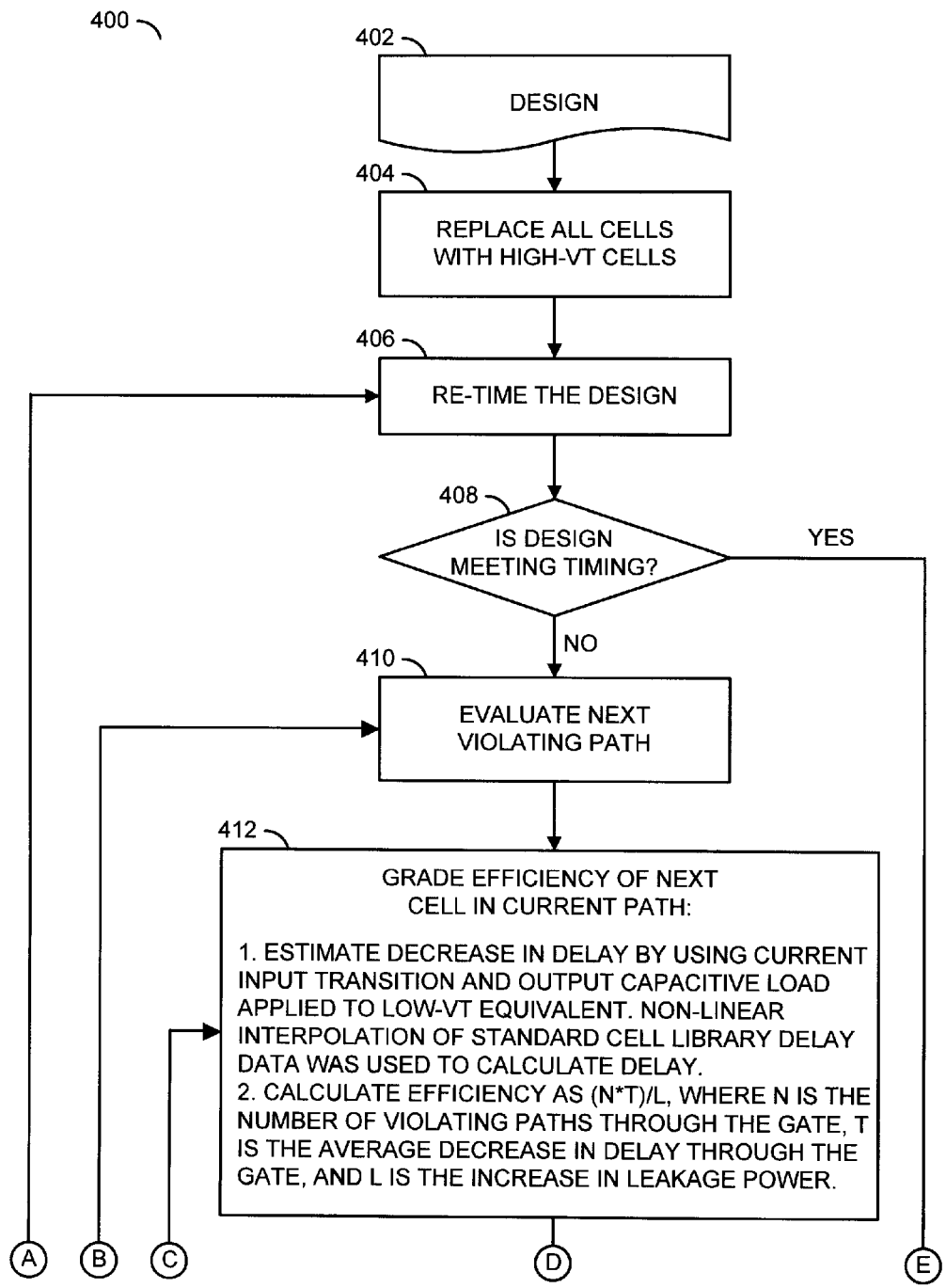
FIG. 4 is a flow diagram illustrating an example of a process in accordance with the present invention.
Figure 4B:
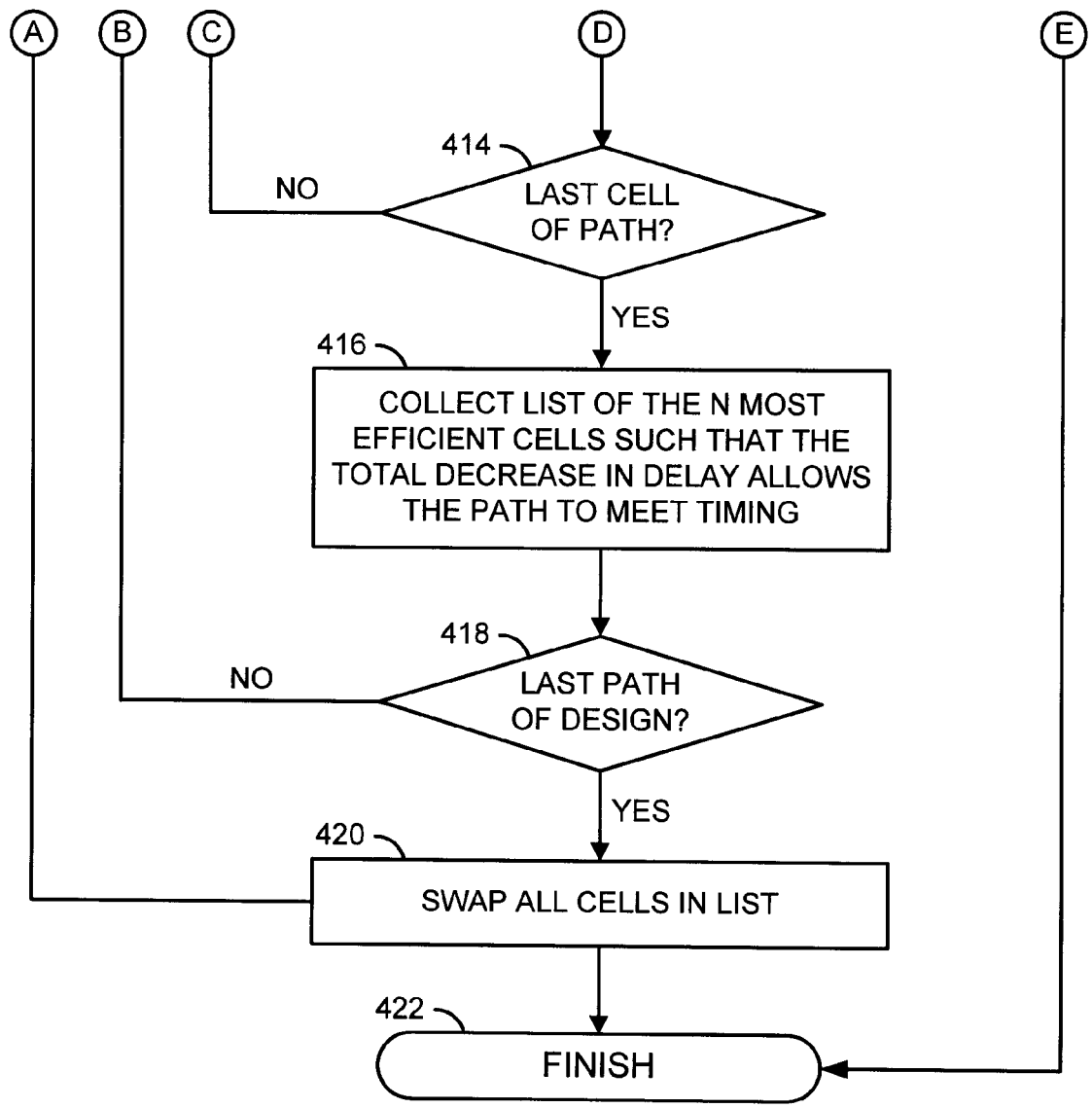

Referring to FIG. 4, a flow-chart of a method 400 is shown. A method 400 generally comprises a state 402, a state 404, a state 406, a decision state 408, a state 410, a state 412, a decision state 414, a state 416, a decision state 418, a state 420 and a state 422. The state 402 may be a design state. The state 404 may be used to replace all cells with high-Vt cells. The state 406 may retime the design from the state 402. The decision state 408 may determine if the design meets a specific timing requirement. If so, the method 400 moves to the state 422. If not, the method 400 moves to the state 410. The state 410 evaluates a violating path. The state 412 provides a great efficiency of the next cell in a current path. The decision state 414 determines if the cell was the last cell of the path. If so, the method 400 moves to the state 416. If not, the method 400 moves back to the state 412. The state 416 collects a list of the small and most efficient cells such that the total decrease in delay allows the path to meet the timing specification. The decision state 418 determines if the path was the last path of the design. If so, the method 400 moves to the state 420. If not, the method 400 moves back to the state 410. The state 420 swaps all cells in the list.

While the present invention has been described in connection with a design having a total positive timing slack, the present invention may also be implemented with other design constraints. For example, the present invention may be used where a design has a path that violates timing. In such an example, the present invention may be used to gain back some time while minimizing the increase in leakage power. The end goal in such a design may be to reduce leakage power while just meeting the timing constraints. An alternate efficiency grading may be implemented. Generally, the efficiency of swapping one cell with another cell may be expressed as a ratio of the change in delay verus the change in leakage power. In the present example, the ratio may be thought of as the decrease in delay versus the increase in leakage.

The present invention may have a variety of applications and/or implementations. In one implementation, the present invention may be implemented on a mature design (e.g., a design that has been synthesized from register-transfer language (RTL) to gates and has been placed-and-routed). In such an implementation, the present invention may mainly be used for cell-swapping, since the structure of the gates is in place. Such a design already meets timing constraints, but has not been optimized with respect to leakage. A first pass with such an implementation may involve swapping all cells to high-Vt cells (e.g., slower, but lower-leakage gates). Such a design may be expected to initially violate timing on a number of timing paths. The implementation may then begin to iteratively swap in low-Vt cells to gain back the timing. The implementation may first swap the most efficient cells as graded by delay-decrease vs. leakage-increase. Such an implementation considers swapping a multi-Vt equivalent cell (e.g., a cell with the same footprint and/or size). Swapping equivalent cells has a minimal impact on layout. However, the present invention may also swap a logically equivalent, but not threshold equivalent, cell (e.g., an AND gate for an AND gate) in an effort to meet timing with a minimal gain in total leakage power.

The present invention may also have applications beyond cell swapping. For example, the present invention may be used during the synthesis and place-and-route stages of a design. The present invention may be implemented as a macro run within a synthesis and place-and-route software tool. The present invention may also be incorporated into future versions of such a software tool. Such an implementation would allow a synthesis and place-and-route EDA tool to consider multiple structures and may have far more flexibility to meet timing, while maximizing the total leakage power needed.

Regardless of the particular implementation and/or application, the present invention may be used to create a design that meets the timing constraints with a minimum impact on the amount of leakage power used. The invention normally uses the grading of cells based on efficiency ratios.

The grading is normally calculated relative to a theoretical case. A theoretical case may be a design that has infinite delay and zero leakage. Compared with the theoretical case, a cell used in the design will decrease the delay by some amount and would increase leakage by some amount.

When choosing a design that has greater leakage power relative to another choice (e.g., a choice that may be the theoretical design having infinite delay and therefore is violating timing), the efficiency grade of the designed cell relative to the other choice may be considered as the decrease in overall delay versus the overall increase in leakage. In such a case, the larger the ratio the better. An increase in delay, coinciding with an increase in power leakage, results in a negative ratio. A negative ratio is an undesirable condition that should normally be avoided. When choosing a cell that has a smaller leakage power relative to another choice (e.g., when choosing alternative cells from an implementation that does meet timing and therefore has opportunity to reduce leakage), the efficiency grade may be considered the decrease in delay versus the decrease in leakage. In such a case, a slower, lower leakage cell would likely be used as a replacement cell. Such a ratio would be negative in most cases, since the delay would be increasing.

The present invention provides results that are not available with other synthesis tools. In a particular implementation of the present invention, a design that had already been fully placed and routed provides an improvement in leakage power by over 50% after the basic implementation of the present invention. Additional implementations of the present invention may limit swapping to improve runtime by not giving any benefit to cells that improved the timing of more than one path, resulted in an improvement of leakage power by 45%. The effectiveness of the present invention is largely dependent on the design. If a design already meets timing by using all high-Vt cells with the existing EDA tools, the present invention may further improve timing constraints (e.g., the clock frequency could have been increased by some amount) without any compromise in leakage power.

While the invention has been particularly shown and described with reference to the preferred embodiments thereof, it will be understood by those skilled in the art that various changes in form and details may be made without departing from the scope of the invention.

The invention claimed is:

1. A method for designing an integrated circuit having a number of cells, comprising the steps of:
   (A) calculating a value using a computer for each of a plurality of equivalent cells in said design; and
   (B) selecting a number of said plurality of equivalent cells based on said values, wherein said equivalent cells (i) decrease an overall delay of a path to meet a timing specification, (ii) minimize an increase in overall leakage current, (iii) are configured to provide an operation equivalent to said cells and (iv) said values comprise a ratio of change in delay versus a change in leakage power.

2. The method according to claim 1, wherein said values comprise a ratio of decrease in delay versus an increase in leakage power.

3. The method according to claim 1, wherein step (B) selects said number of said plurality of equivalent cells further based on a number of paths each cell is used with.

4. The method according to claim 1, wherein step (B) selects said number of said plurality of equivalent cells further based on minimizing cross-talk interference.

5. The method according to claim 1, wherein said plurality of equivalent cells comprise (i) low-Vt cells and (ii) high-Vt cells.

6. The method according to claim 1, wherein said method further comprises estimating a change in gate delays.

7. The method according to claim 1, wherein said method repeats steps (A)-(B) until an optimal timing-leakage power balance is obtained.

8. The method according to claim 1, wherein said number of said plurality of equivalent cells comprises at least a single cell.

9. The method according to claim 1, wherein a high-Vt cell reduces said leakage current when replacing a low-Vt cell.

10. The method according to claim 1, wherein a low-Vt cell changes said delay when replacing a high-Vt cell.

11. The method according to claim 1, wherein said method analyzes all cells along said path.

12. The method according to claim 1, wherein said method further comprises choosing to use a plurality of low-Vt cells to obtain a greatest timing improvement per increase in leakage power.

13. A computer readable medium comprising computer executable instructions that, when executed by a computer, perform the steps of:
- (A) calculating an efficiency value using the computer for each of a plurality of equivalent cells in a design; and
- (B) selecting a number of said plurality of equivalent cells based on said values, wherein said equivalent cells (i) decrease an overall delay of a path to meet a timing specification, (ii) minimize an increase in overall leakage current, (iii) are configured to provide an operation equivalent to said cells and (iv) said efficiency values comprise a ratio of timing saved versus a increase in leakage power.

14. The computer readable medium according to claim 13, wherein said plurality of equivalent cells comprise (i) low-Vt cells and (ii) high-Vt cells.

15. The computer readable medium according to claim 13, wherein said computer readable medium repeats steps (A)-(B) until an optimal timing-leakage power balance is obtained.

16. The computer readable medium according to claim 13, wherein step (B) selects said number of said plurality of equivalent cells further based on a number of paths each cell is used with.

17. The computer readable medium according to claim 13, wherein step (B) selects said number of said plurality of equivalent cells further based on minimizing cross-talk interference.

18. The computer readable medium according to claim 13, wherein said computer readable medium analyzes all cells along said path.

\* \* \* \* \*